United States Patent Office 3,056,713
Patented Oct. 2, 1962

3,056,713
PROCESS FOR THE REGENERATION OF WASTE PAPER
Wilhelm Gärtner, Neunkirchen, Odenwald, Germany, assignor, by mesne assignments, to FMC Corporation, a corporation of Delaware
No Drawing. Filed Oct. 7, 1960, Ser. No. 61,083
Claims priority, application Germany Oct. 8, 1959
5 Claims. (Cl. 162—5)

The present invention relates to an improved process for the regeneration of waste paper.

The present invention relates to an improved process for the regeneration of waste paper by removing impurities, particularly ink values, therefrom.

German Patent 969,809 discloses a process for the regeneration of waste paper. The present invention represents an improvement in the process disclosed in this German patent. According to this prior art process waste paper is treated with a bath which contains (a) sodium or potassium silicate (water glass); (b) at least one compound to act as a source of active oxygen, such as hydrogen peroxide, sodium peroxide, perborates, percarbonates, etc.; (c) at least one protective colloid containing nitrogen in the form of an amide or sulfonamide type grouping and (d) at least one nitrogen free compound to act as a wetting or washing agent. For the nitrogen containing protective colloids it is preferable to use, in that process, condensation products of a soluble protein or a higher molecular weight protein cleavage product with a saponifiable fatty, resinic or naphthenic acid or with an aliphatic or aliphatic-aromatic sulfonic acid. The nitrogen free wetting and washing agents contemplated within the scope of the patented process include, among others, alkyl benzene sulfonic acid salts whose alkyl groups contain 10 to 18 carbon atoms.

It has now been found according to the present invention that excellent results can still be obtained if, instead of using the bath described in German Patent 969,809, a bath is used which does not contain a nitrogen bearing protective colloid. Unexpectedly, this simplification of the composition of the bath described in the German patent does not cause any disadvantages when such composition is used for treating waste paper. The impurities present in the waste paper, in particular the printer's ink and other colored ink materials are still expediently removed from the paper fibers, disseminated in the liquor and thereafter removed with the liquor from the presence of the paper materials by commonly used techniques, such as by filtering on a dewatering sieve.

In printed waste paper only a relatively small portion of the paper fibers are directly coated with the printer's ink. The customary defibering processes which are used for the treatment of waste paper, as for example, pulping in an edge mill, beating in a pulper and deinking in a refiner or the like, are conducted in such a fashion that the printer's ink is smeared over all the fibers. Such a treatment often leads therefore to a significant reduction in the effect of the deinking processes. It is therefore advantageous in this regard not to pulp the different waste papers before the deinking process of the present invention but to place them in the liquor bath in an unpulped state, for example, merely cut into relatively large sized strips. As a further advantage of this manner of treating waste paper there is to be mentioned the fact that the peroxide-$SiO_2$ wash liquor solution of the present invention facilitates the subsequent pulping of the thus treated paper.

When faced with impurities that are very difficult to remove, for example, colored inks and the like, it is expedient in many cases that the waste paper be reduced to a pulpy mass after the wash liquor treatment and then subject it to a flotation treatment with the aid of a foaming agent and a foam collector in a manner known to the art. The coloring matter still remaining in the paper fibers is thereby caught up in the foam for the most part and in this way can be separated from the waste paper fibers.

If it is desirable to attain an even higher degree of whiteness in the paper that is being treated, then it is advantageous to follow the flotation treatment by a treatment with a reducing bleaching agent, for example, sodium dithionite.

Other nitrogen-free wetting and washing agents contemplated within the scope of the invention are e.g. ethoxylated fatty alcohols, ethoxylated alkyl phenols and ethoxylated condensation products of fatty acids.

The following examples are merely illustrative of the scope of the present invention and are not intended as a limitation thereon.

*Example 1*

500 kg. of printed newspaper were soaked with 2000 l. of an aqueous solution which contained 10 kg. of sodium peroxide, 25 kg. of water glass (38° Bé.) and 2.5 kg. of a nonionic fatty alcohol polyethylene glycol ether wetting agent (with 40 $CH_2O$-groups per mol) in a spherical boiler by agitating the boiler. The system was then allowed to stand at room temperature for two hours.

The material that was thus treated was then well dispersed into the form of a pulp with 7500 l. of water, then further diluted to a solids content of 2% and then concentrated to a solids content of 30% by means of a water removal filter. After this operation the largest portion of the printer's ink was contained in the water that had been removed by the filter. The residual fibrous material concentrate was then conducted to hollanders where it was used for the preparation of paper whole stuff.

By means of an additional washing treatment of the material retained on the water removal filter (by diluting it to a 1% solids content and again removing the water by filtering to attain a 5% solids content) a more extensive purification of the waste paper is obtained.

The original waste newspaper had a whiteness content of 46 to 48%; after the first washing treatment the whiteness content of the paper amounted to 56 to 57% and after the second washing it had a whiteness content of 60 to 64%.

*Example 2*

500 kg. of a color printed illustration paper were first treated as described in Example 1. After the treated paper had been beaten up at a solids content of about 5% the pulpy mass was in turn diluted to a solids content of 0.8%. 5 liters of petroleum (B.P. 140° C.) where then added thereto and air was introduced therein in a flotation apparatus. The resulting foam was removed and the aqueous phase concentrated to a solids content of 5% and the pH of the system then adjusted to 5 to 6 at 40° C., with sulfuric acid. 2.5 kg. of sodium dithionite were then added to the system and it was allowed to stand for 1 hour at 40° C.

The whiteness content of the original waste paper was 48% and that of the final product was 60 to 65%.

*Example 3*

1000 kg. of printed newspaper strips were soaked in a rotating drum with 8000 liters of an aqueous solution containing 20 kg. of $Na_2O_2$, 50 kg. of water glass (38° Bé.) and 6 kg. of an ethoxylated alkyl phenol. The system was then allowed to stand at 40° C. for 2 hours. The mixture was then diluted to a solids content of 6%, disintegrated in a grinding hollander and further diluted to a solids content of 1%. The fibers were subsequently separated from the printing ink in a flotation apparatus. The dispersion of the fibers was concentrated and used for the manufacture of paper in the known manner.

*Example 4*

1000 kg. of printed paper were soaked with 4000 l. of an aqueous solution containing 50 kg. of $H_2O_2$, 40 kg. of NaOH, 60 kg. of water glass and 5 kg. of a wetting agent. The paper was disintegrated and was then flotated after the addition of a small amount of petroleum (B.P. 140° C.). The fibers were separated from the printing ink and used for the manufacture of paper.

*Example 5*

500 kg. of printed paper strips were soaked in a pulper with 10,000 l. of an aqueous solution containing 15 kg. of $Na_2O_2$, 20 kg. of water glass (38° Bé.) and 5 kg. of an alkyl aryl sulfonate as wetting agent. After standing for 30 minutes the paper was disintegrated by beating in the pulper. After passing the mixture through a refiner in order to eliminate metallic and other hard impurities the dispersion was beaten in a high speed disintegrator thereby dispersing the fiber bundles and agglomerations of impurities still present. The dispersions was then diluted and separated by flotation from the printing ink and other impurities. Most of the water was filtered off and the fibers were bleached at 40° C. during a period of 2 hours after adding 1% of $Na_2O_2$ and 2% of water glass. The bleached pulp was neutralized by addition of sulfuric acid. Fresh pulp and filling agents were added. The resulting mixture was worked up to give printing paper of illustrated magazines.

*Example 6*

1000 kg. of printed paper were soaked in 20,000 l. of an aqueous solution containing 10 kg. of $Na_2O_2$, 40 kg. of water glass (40° Bé.) and 2 kg. of an ethoxylated fatty alcohol and disintegrated in a pulper at 55° C. After 30 minutes the pulp was transferred to another vessel and allowed to stand for 1½ hours. Then the pulp was sent through a purifier and a high speed edge mill. Finally the pulp was diluted to a solids content of 0.8%, a solution of soap was added and the fibers were separated by flotation from the printing ink.

The pulp was concentrated to a solids content of 6%, a solution of $Na_2O_2$ was added, the mixture was heated to 45° C. by steam and allowed to stand for 2 hours; it was then neutralized by addition of sulfuric acid.

By the above treatment the degree of whiteness was increased from 45 to about 65.

I claim:
1. A process for the regeneration of waste paper comprising treating said paper in unpulped form with an aqueous alkaline bath essentially consisting of an aqueous solution containing about 0.2 to 1.5% by weight of water glass, about 0.05 to 1.25% by weight of at least one peroxygen active oxygen yielding compound and at least one nitrogen free organic compound from the group consisting of the alkyl benzene sulfonic acid salts whose alkyl groups contain 10 to 18 carbon atoms, the ethoxylated fatty alcohols, the ethoxylated alkyl phenols and the ethoxylated condensation products of fatty acid having wetting and washing properties and separating the treated paper from the bath.
2. A process as in claim 1 in which said paper is pulped after said treating and the pulp is subjected to a flotation process to remove residual impurities therefrom.
3. A process as in claim 2 further comprising treating the pulp with a reducing bleaching agent.
4. A process as in claim 3 in which said reducing bleaching agent is sodium dithionite.
5. An aqueous bath essentially consisting of about 0.2 to 1.5% by weight of water glass, about 0.05 to 1.25% by weight of at least one peroxygen active oxygen yielding compound and about 0.01 to 0.12% by weight of at least one nitrogen free organic compound from the group consisting of the alkyl benzene sulfonic acid salts whose alkyl groups contain 10 to 18 carbon atoms, the ethoxylated fatty alcohols, the ethoxylated alkyl phenols and the ethoxylated condensation products of fatty acids having wetting and washing properties.

References Cited in the file of this patent

UNITED STATES PATENTS

| | | |
|---|---|---|
| 988,874 | Henkel | Apr. 4, 1911 |
| 1,727,722 | Lewis | Sept. 10, 1929 |
| 1,988,363 | Snyder | Jan. 15, 1935 |
| 2,525,594 | Fennell | Oct. 10, 1950 |
| 2,582,496 | Massey | Jan. 15, 1952 |
| 2,975,139 | Kauffmann | Mar. 14, 1961 |
| 3,003,910 | Dithmar | Oct. 10, 1961 |

FOREIGN PATENTS

| | | |
|---|---|---|
| 969,809 | Germany | July 17, 1958 |

OTHER REFERENCES

Ellis: Printing Inks, pub. by Reinhold Pub. Co., N.Y., N.Y., 1940, pp. 480–483.